US008646189B2

(12) United States Patent
Tjerrild

(10) Patent No.: US 8,646,189 B2
(45) Date of Patent: Feb. 11, 2014

(54) PISTACHIO/NUT DRYER-ASSEMBLY AND METHOD

(76) Inventor: James William Tjerrild, Fresno, CA (US)

( * ) Notice: Subject to any disclaimer, the term of this patent is extended or adjusted under 35 U.S.C. 154(b) by 397 days.

(21) Appl. No.: 12/688,556

(22) Filed: Jan. 15, 2010

(65) Prior Publication Data

US 2011/0173833 A1    Jul. 21, 2011

(51) Int. Cl.
F26B 19/00 (2006.01)
F26B 17/12 (2006.01)

(52) U.S. Cl.
USPC .................. 34/166; 34/167; 34/174; 34/175

(58) Field of Classification Search
USPC ........... 34/165, 168, 174, 175, 209, 210, 215, 34/216, 217, 218, 226, 167
See application file for complete search history.

(56) References Cited

U.S. PATENT DOCUMENTS 3,400,466 A * 9/1968 McClaren ...................... 34/483
3,482,714 A * 12/1969 Oguri et al. ................... 414/171
3,869,809 A * 3/1975 Keirn ............................. 34/174
3,955,288 A * 5/1976 Keirn ............................. 34/174
4,106,212 A    8/1978 Batterton et al.
4,212,115 A    7/1980 Adler
5,251,385 A   10/1993 Secor et al.
6,163,978 A   12/2000 Hinner
6,202,319 B1 * 3/2001 Bening .......................... 34/165
6,499,228 B2 12/2002 Nakhei-Nejad
2009/0226577 A1  9/2009 Szeflin

OTHER PUBLICATIONS

M. Kashani Nejad et al., Effect of Drying Methods on Quality of Pistachio Nuts, The Society for Engineering in Agricultural, Food, and Biological Systems, pp. 1-16, Paper No. MBSK 02-213, ASAE, St. Joseph/MI (identified as publication for presentation on Sep. 27-28, 2002).

* cited by examiner

Primary Examiner — Jiping Lu
(74) Attorney, Agent, or Firm — Neal, Gerber & Eisenberg LLP

(57) ABSTRACT

The present invention provides an improved continuous vertical feed pistachio nut dryer that has an inner compartment defined by bulkhead walls formed of smooth and seamless outer walls of perforated sheet stock, and has an infeed chamber with a batch hopper used in conjunction with an auger to provide a structure configured to operate in a batch fill mode wherein the inner compartment is filled evenly along the length of the dryer.

18 Claims, 7 Drawing Sheets

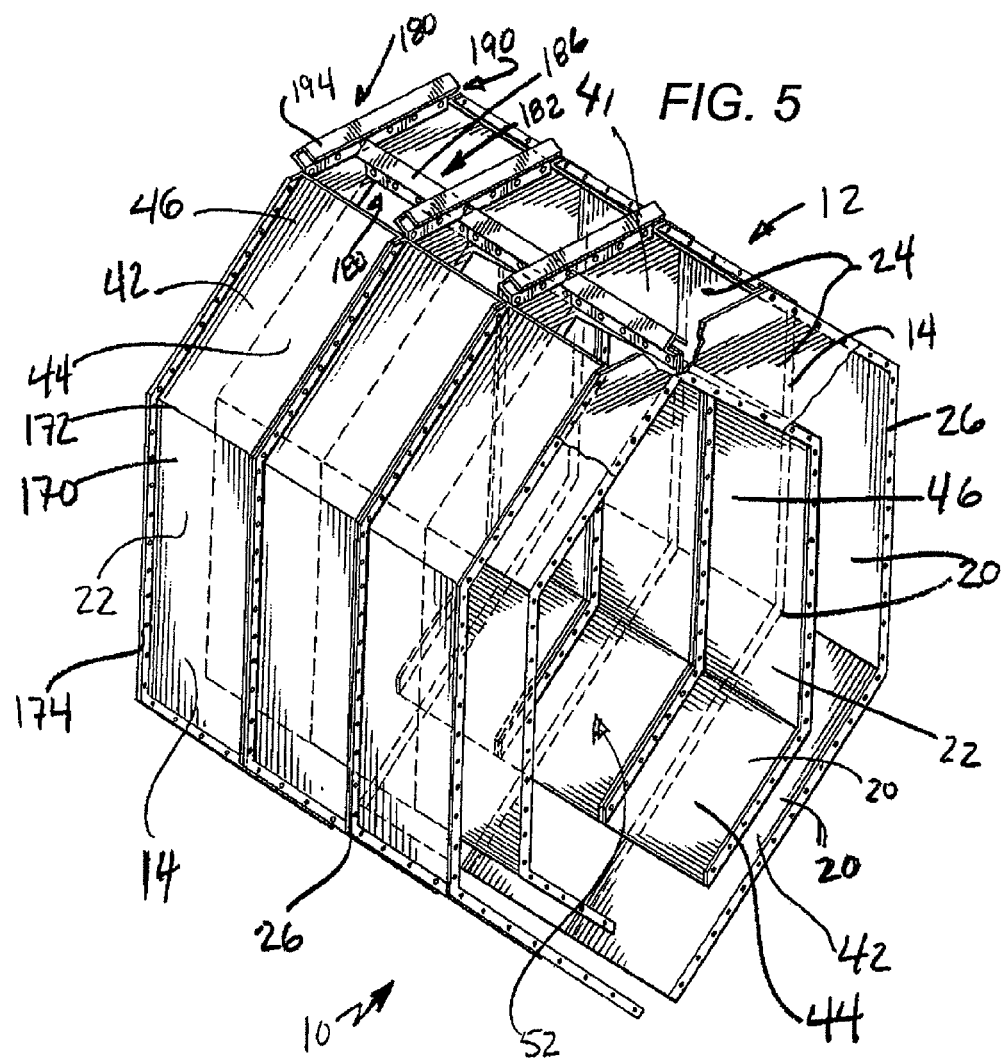

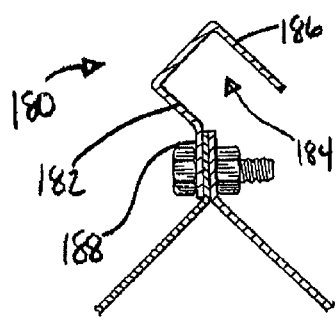
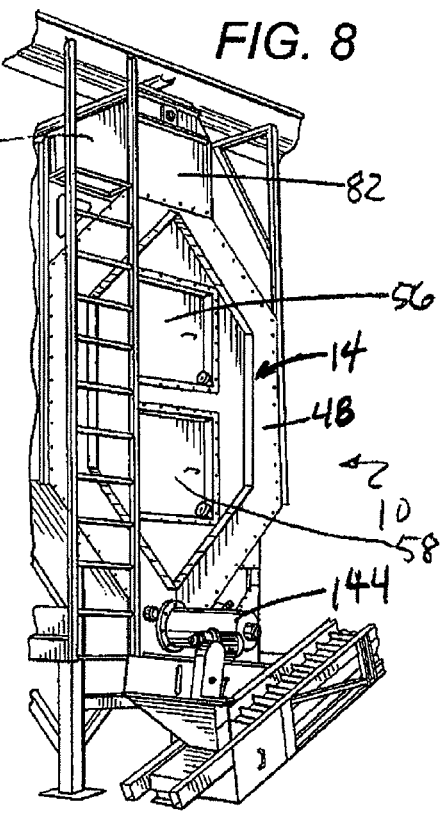
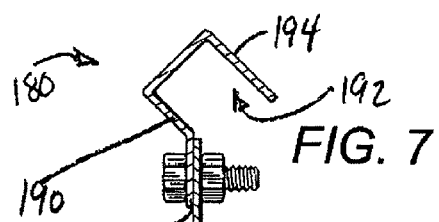
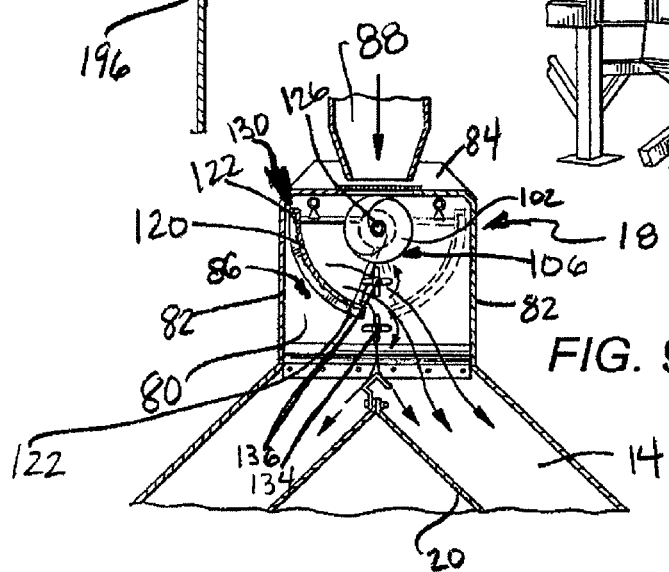
FIG. 6
FIG. 7
FIG. 8
FIG. 9

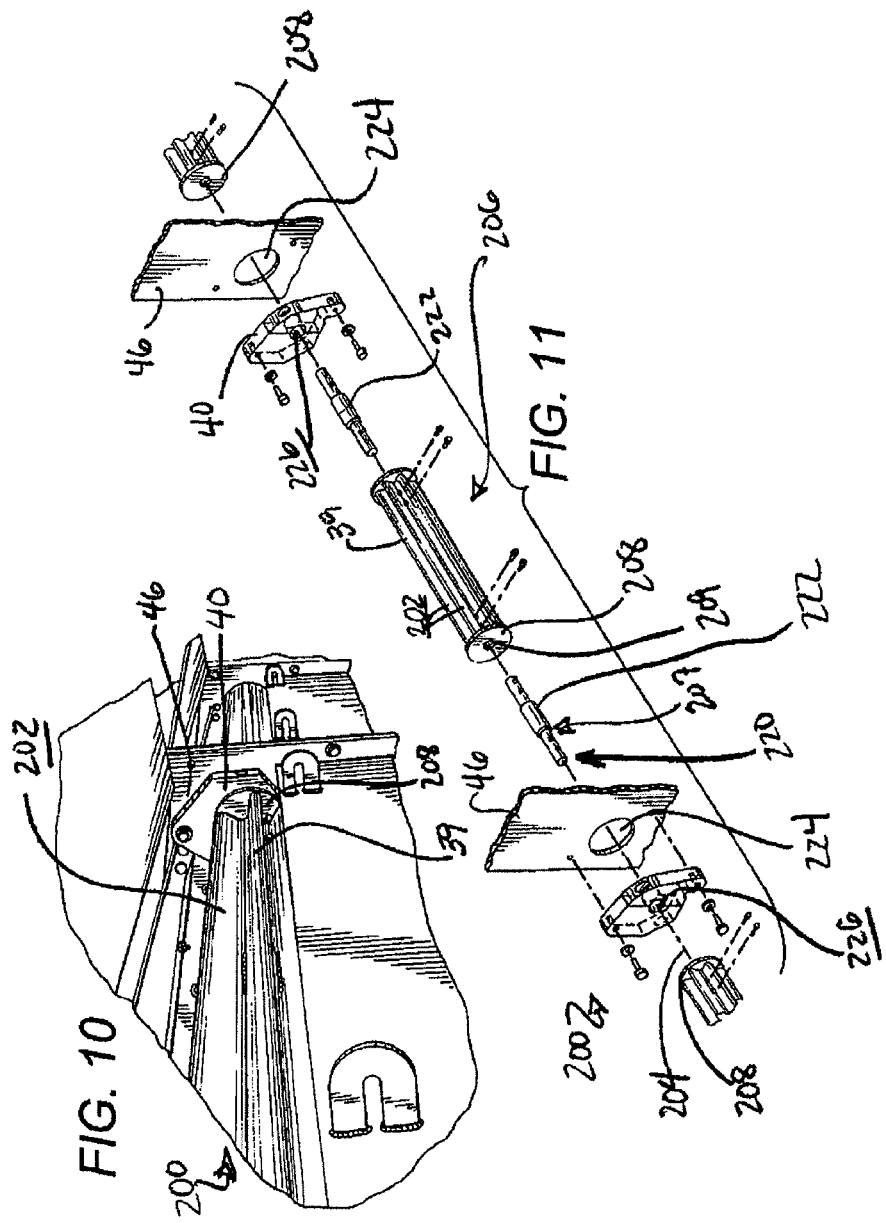

US 8,646,189 B2

PISTACHIO/NUT DRYER-ASSEMBLY AND METHOD

TECHNICAL FIELD

The present invention relates to a dryer apparatus and method and, more specifically, an apparatus and method for drying harvested and processed pistachio nuts to achieve suitable dryness for storage of the nuts while maintaining optimal conditions throughout the drying process for preferred flavor of the processed and dried pistachio nuts.

BACKGROUND

Pistachio nuts, once harvested, must be processed and dried in a very short period of time in order to preserve freshness and to derive an end result of nuts with desirable organoleptic properties to potential consumers. The drying process for pistachio nuts varies greatly with the type of equipment used, which may range from sun-drying methods to batch drying nuts when subject to heated air. One type of apparatus for drying nuts and grains with heated air is a device that is referenced as a continuous feed vertical dryer, which utilizes large forced-air heaters that push dry air through the dryer device to achieve a desired moisture level of the material being dried. Such dryer devices are typically used for drying gains such as field corn, and are often utilized for drying nuts, including pistachio nuts, without significant modification with concern for specific properties or needs for pistachio nuts being dried and processes. Also, such dryer devices typically have a large internal capacity for drying sizable volume of material in a batch, usually filled in a continuous fill operation in which the entire dryer inner chamber must be filled before it is operational for drying. This construction and fill operation is depicted in FIG. 4A herein. If such a device were only partially filled, the heated air would move through open, unfilled regions of the device, rather than passing through the seeds/nuts packed in the device, resulting in inefficient drying unless the device is completely filled. In this manner, the typical dryer assemblies used for continuous feed vertical drying of seeds and the like are not suitable for drying pistachio nuts, and there is a need for improvements.

Also, typically, continuous feed vertical dryers are constructed of sheet stock, such as joined pieces of perforated metal sheets, are joined together such that small spaces and joint-seams are exposed as the material passes down through the dryer. This results in the material, or debris associated with the material (such as small twigs mixed with pistachio nuts being dried), being sometimes caught within the spaces/ seams and causing a back-up that disrupts flow and/or causes a risk of fire. Finally, typical prior art dryer assemblies are constructed in a ways that mike it difficult to clean or repair the assembly or parts. For example, typical prior art dryers are equaled with bottom rollers that assist with control of the flow of nuts through the dryer. Such rollers, usually constructed of a single elongated paddle style roller, are inserted as a single length of roller seated in wooden yokes. This construction has the disadvantage of being difficult to service in the event the roller breaks or a supporting yoke needs replacing. Typically, such repair is done by removing the roller from the entire apparatus, which requires much time and multiple workers to complete.

There are numerous other deficiencies relating to typical dryer assemblies in relation to drying pistachio nuts. These include difficulties with controlling the flow rate of nuts being introduced into and migrating through the dryer, as well as lack of a way to put out a fire if one occurs in the dryer, resulting in significant financial loss due to damage of a dryer full of nuts. Thus, there is a need for improved structure and processes for drying pistachio nuts. The present invention solves these and other deficiencies that exist with the typical dryer assemblies.

BRIEF SUMMARY

The present invention includes a dryer apparatus for drying pistachio nuts that has a bulkhead with an inner compartment that is defined by at least an outer wall and an inner wall formed of perforated sheet material that allows forced air through the walls, the walls defining an inner compartment with a at least one generally vertical passageway positioned below an infeed chamber. The infeed chamber includes an elongated auger and a batch hopper that is positioned adjacent the auger, wherein the batch hopper is movable between a first position located generally below said auger and a second position located adjacent and to a side of the auger. The present invention further provides a structure configured to operate in a selectable mode of operation of the infeed assembly, including a batch fill mode and a continuous fill mode. In the batch fill mode, the batch hopper is moved between positions below the auger and adjacent the auger, such that the inner compartment of the dryer is filled evenly along the length of the dryer. In the continuous fill mode, the batch hopper is positioned away from the auger such that the dryer is filled with nuts in a sequential sequence beginning at the end nearest the input of nuts.

The present invention also provides a structure and operation of a pistachio nut dryer that has a bulkhead constructed as a seamless sidewall of perforated sheet stock such that the nuts freely pass through the inner passageway of the dryer and are not exposed to seams that may catch the nuts or build up debris. This construction also provides ridge guards of a tent structure to cover any seams or exposed edges of the vertical walls of the inner compartment of the dryer.

BRIEF DESCRIPTION OF THE DRAWINGS

To understand the present invention, it will now be described by way of example, with reference to the accompanying drawings in which:

FIG. 5 is a partial sectional view of a central portion of the apparatus of FIG. 1 constructed of bulkhead wall panels connected together and ridge-guards at top seams of the panels;

FIG. 6 is a sectional view of a ridge guard such as that which is shown at the top of the sectional view of the dryer apparatus in FIG. 5;

FIG. 7 shows a ridge guard of an alternate configuration from that which is shown in FIG. 6, which is attached at a top ridge of a bulkhead wall;

FIG. 8 is a partial end view of the apparatus shown in FIG. 1;

FIG. 9 is a partial cross-sectional view of the upper portion of the apparatus of FIG. 1, showing the pivotal movement of the inner mechanism positioned below the top auger FIG. 10 is a partial sectional view of a lower portion of the dryer of FIG. 1, with an access panel partially removed to show the outfeed roller and related parts of the outfeed assembly; and, FIG. 11 is an exploded view of the roller assembly portion of outfeed assembly of the dryer shown in FIG. 1, showing the related components of the outfeed roller and saddle bearings.

DETAILED DESCRIPTION

Figure 1:
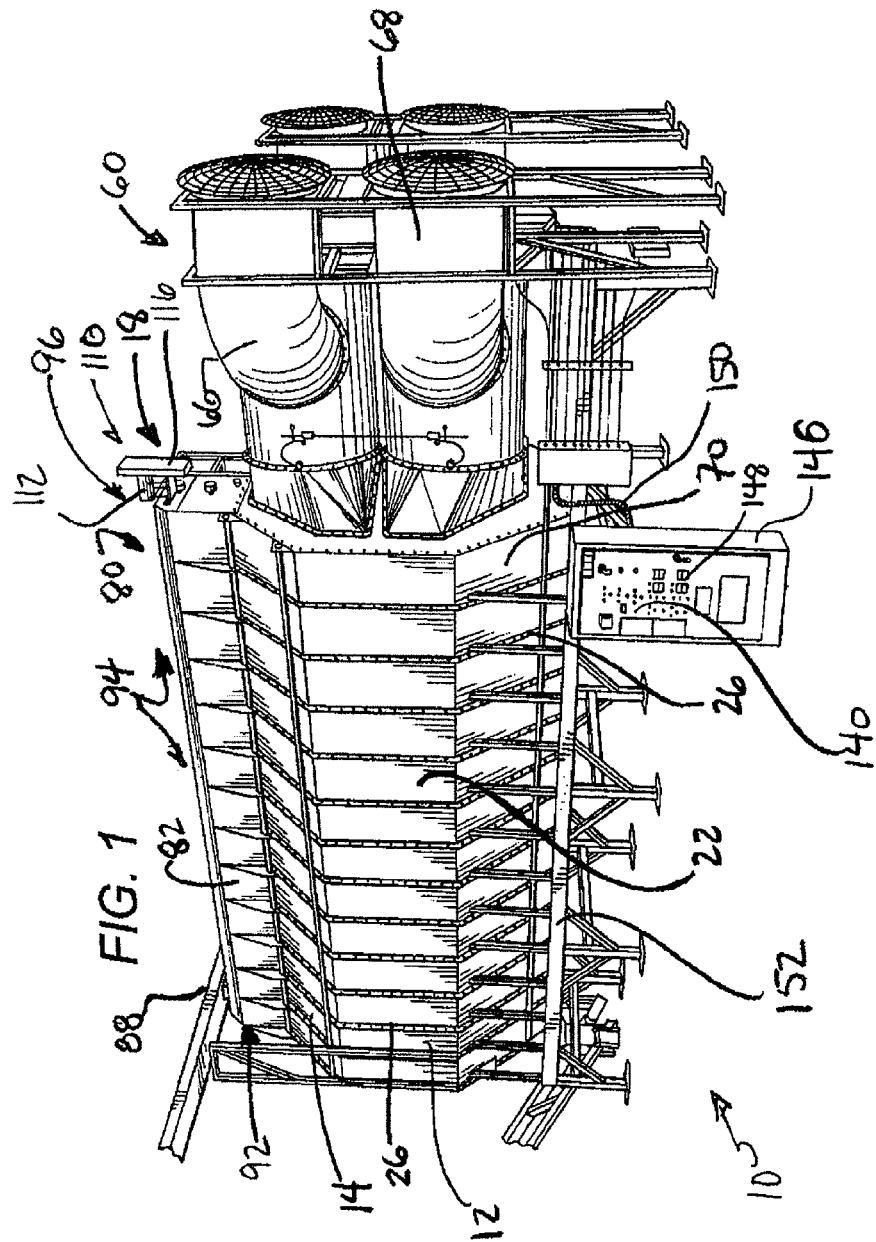
FIG. 1 is a perspective view of the dryer apparatus having structure and method according to the present invention.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

The dryer apparatus improvements according to the preferred embodiment of the present invention apply to a type of dryer that may be referenced as a continuous feed vertical dryer apparatus 10. The apparatus includes an inner compartment assembly 12 formed as a generally vertically-extending passageway 14 that is filled with the materials to be subject to drying, preferably pistachio nuts 16, and a continuous flow of heated dry air is forced through the apparatus and flows through the nuts 16 slowly passing through the vertically-extending passageway 14. The pistachio nuts 16 are processed through the dryer to remove the free and internal water/moisture that resides on the surfaces of the nuts and within the meat and shell of the nuts.

In the preferred form of the present invention, the nuts 16 are continuously supplied into the inner compartment 12 by an infeed assembly 18 located above the generally vertically-extending passageway 14, and the flow of the nuts 16 through the passageway 14 is regulated by a flow mechanism 28 for adjusting the rate of nuts allowed to exit the compartment 12 at the end or bottom of the passageway 14, while large burner assemblies 28 force air, such that heated dry air flows through the inner compartment 12, thus resulting in a drying process of the pistachio nuts 16. The flow mechanism 28 for adjusting the flow rate through the compartment 12 utilizes multiple possible mechanical arrangements to provide an adjustable opening of a gate structure 30 located at the bottom of the compartment 12. In the preferred embodiment, the gate structure 30 includes a gated opening 32 that allows only a limited flow of nuts in a given period of time. In the embodiment shown in the Figures, the gate 30 is primarily made up of a large plate structure 34 that is positioned over an open end 36 of the passageway 14, thus forming a slide gate assembly 38 associated with each passageway 14 of the compartment 12 (see FIG. 3). The slide gate assembly 38 may include several independently-operable gate structures, each associated with differing passageways. Alternatively, the slide gate assembly 38 may include an elongated plate 34 that extends longitudinally down the length of the dryer 10 to form a gate across several or all of the passageways on one side of the apparatus 10. In yet another embodiment, the gate structure of each compartment may be independent and yet be optionally operable in a uniform manner. Providing several such plates 34 along the length of the dryer 10, rather than a single elongated plate, can provide increased versatility regarding controlling the flow of the material with ideal level of moisture, essentially allowing an operator to adjust the flow of nuts from one passageway compartment independent of the flow through another passageway compartment. Further, such a structure, having multiple plates 34 that may be optionally controlled independently, or in a uniform manner, provides the greatest amount of versatility of use of the assembly with varying load of nuts 16 and other variable conditions for operation of the assembly.

In the preferred form of the invention, the flow mechanism 28 includes, in addition to adjustable gates 30 with gate openings 32, an outfeed roller 39 to mechanically control the rate of nuts 16 that move through and exit the inner compartment 12. In the preferred embodiment, the outfeed roller 39, as is described further herein and shown in FIGS. 3 and 10-11, includes a compartmentalized roller assembly that rotates on an arrangement of split saddle bearing 40 mounted to the inner compartment 12 adjacent the gate assemblies 38.

In a preferred embodiment, the parts of the flow mechanism 28, including the gated opening 32 and the outfeed rollers 39, are independently adjusted to achieve an optimal and desired flow rate of nuts 16 passing through the passageway 14, preferably at an optimal flow rate in the range of approximately 4,000 to 6,000 pounds of nuts per hour, and most preferably approximately 5,000 pounds of nuts per hour with the dyer size and arrangement show in the Figures, which is referenced as a "single stack" dryer arrangement. Other flow rates may also be acceptable, depending on the volume of nuts to be processed, the speed of nuts being delivered at the infeed assembly 18, the moisture content of the nuts located at the bottom of the passageway 14 and/or expelled from the gated opening 32, the moisture level of the nuts at the infeed assembly 18, and the temperature in the passageway 14. In a preferred form of the invention, the flow rate of nuts 16 achieved by adjustment of the flow mechanism 39 is established by measurement of the moisture content of the nuts at the bottom of the inner compartment and/or the nuts exiting the assembly 10. The processed nuts at the end of the passageway 14 are allowed to exit the dryer 10 for subsequent storage, must be in the range of less than 6% moisture, to prevent spoiling while in storage. Further, in the preferred form of the invention, the nuts 16 are not subject to temperatures in excess of 140 degrees Fahrenheit, as it is known that exposure to such elevated temperatures may negatively impact qualities of a pistachio nut, such as the preferred taste perceived by a consumer. As is described herein, to achieve optimal drying conditions and desired flow rate, the present invention provides an optimal combination of an assembly with proportioned infeed of nuts 16, a smooth flow of nuts 16 within the inner compartment 12, adjustable and reliable control of the flow of nuts 16 through the apparatus, and adjustable drying functions for smaller batches of nuts 16 being processes.

The vertical-extending passageways 14 of the apparatus 10 are preferably formed as separate compartments along the length of the apparatus 10, and each formed from bulkhead walls 20 of perforated sheet stock 22 formed in an arrangement of a plurality of chambers 24 that are joined by a vertically-extending seam 26. Each passageway compartment 14 has an inner space 41 extending between bulkhead walls 20, formed of four bulkhead walls 20 of perforated sheet stock—namely, an outer wall 42 and inner wall 44 and a pair of generally-opposed end walls, either as a dividing wall 46 or, such as the case with the passageway at each end of the dryer 10, an end wall 48. In this arrangement, the row of vertically-extending passageways 14 collectively form the inner compartment 12 of the dryer as separately-defined inner spaces 40 for passage of the pistachio nuts 16 between perforated sheet stock 22 of the bulkhead walls 42, 44, 46, 48. In the preferred embodiment, there are two generally-opposed groupings of passageways 14, such as shown in FIGS. 1 and 5. This arrangement of passageways 14 forms mating passageways 14 divided by a plenum 52 for warm dry air to be forced along the length of the dryer compartment 12.

In the preferred form of the invention, the plenum 52 includes an upper plenum chamber 56 and a lower plenum chamber 58, thus dividing the inner plenum 52 into two portions. In one embodiment, such as is shown in the Figures, the upper plenum chamber 56 and the lower plenum chamber 58 are substantially the same size, and are divided into two entirely separate chambers by a dividing wall 59, with the lower plenum chamber 58 being in fluid communication with a lower half of the inner compartment 12.

Each portion of the plenum 52 is in fluid communication with a burner apparatus 60, which is generally comprised of at least one gas burner and a blower associated with each burner. In the preferred embodiment shown in the Figures, an upper burner apparatus 66 is aligned with, and supplies heated dry air directed into, the upper plenum chamber 56. Similarly, a lower burner apparatus 58 is aligned with, and supplies heated dry air directed into, the lower plenum chamber 58. This arrangement of a plenum 52 divided into an upper chamber 56 and lower 58 chamber, with a separate burner apparatus 66, 68 associated with each plenum chamber, provides an advantage of versatility of the dryer apparatus 10. This structure is especially important for operation of the dryer to process a volume of nuts 16 that is less than the full capacity of the inner compartment 12 of the dryer 10—i.e., when the dryer compartment 12 is filled with substantially the same volume of nuts in each portion along the length of the dryer compartment, the lower blower apparatus 68 may be run without the upper burner apparatus 66, thus forcing heated dry air through the lower plenum chamber 58 and through the nuts 16 passing through the lower portion 70 of the vertically-extending passageways 14. In the preferred embodiment of this mode of operation of the dryer 10, the flow of nuts 16 into the dryer compartment 12 is regulated such that the lower portion 70 of each passageway 16, adjacent the lower plenum chamber 58, is filled, and the warm air forced into the lower plenum 58 is forced through the perforated sheet 22 into the inner space 41 of the lower portion 70 of the vertically-extending passageways 14. Further, in this mode of operation of the dryer assembly, the nuts 16 are disbursed across the length of the dryer such that the nuts 16 fill the inner passageways 14 in substantially equal amounts in each passageway 14 along the length of the dryer apparatus.

Figure 2:
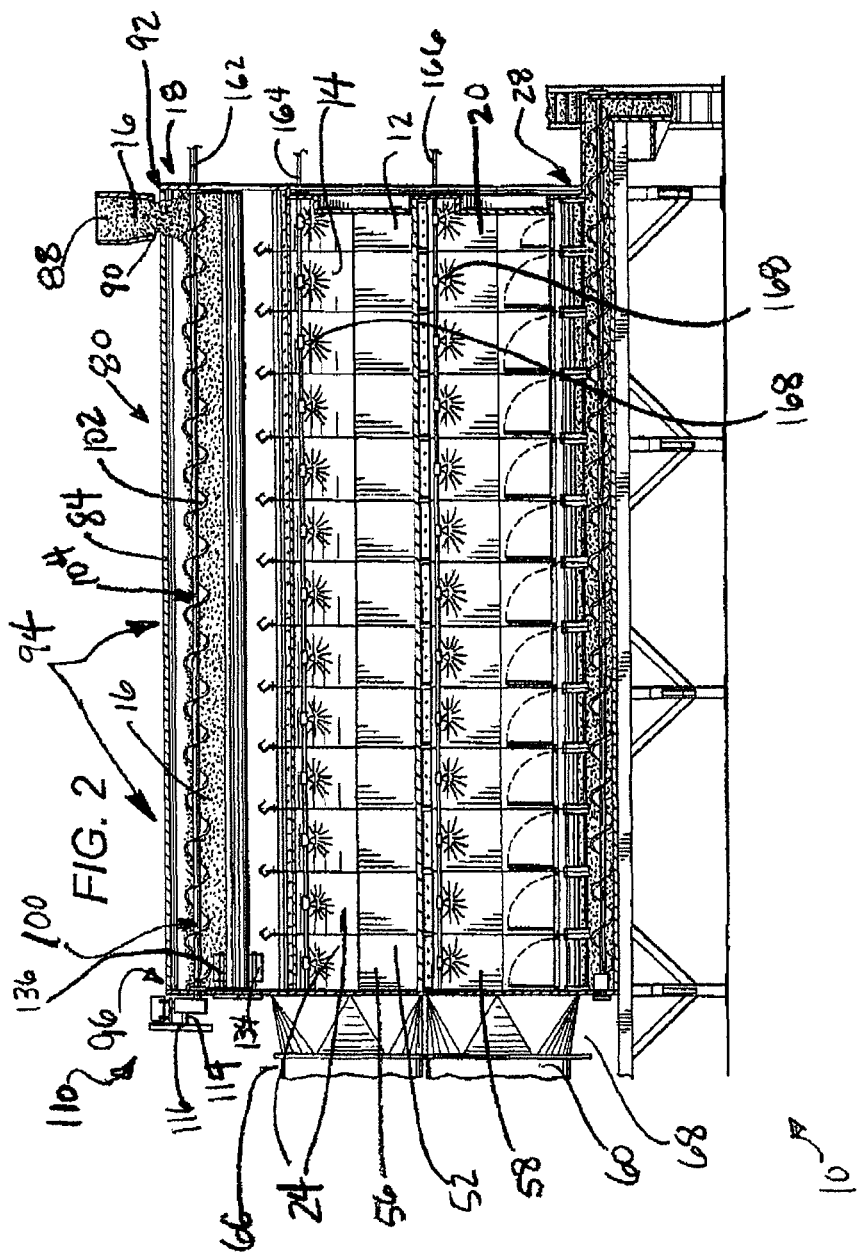
FIG. 2 is a cross-sectional view of the apparatus shown in FIG. 1, taken along the length of the apparatus shown in FIG. 1.

In the preferred embodiment, the infeed assembly 18 includes an infeed chamber 80 preferably located above the passageways 14. As shown in FIGS. 1 and 2, the infeed chamber 80 is preferably a substantially closed compartment formed of sidewalls 82 and a top wall 84 and having an inner space 86. The infeed assembly 18 further includes an infeed supply 88, preferably located at one end of the chamber 80. In the embodiment shown in the Figures, the infeed supply 88 is located at an opening 90 in the top wall 84 adjacent one side of the dryer apparatus 10, generally located above the first of the multiple passageways 14 and adjacent a proximal end 92 of the infeed chamber 80. The infeed chamber 80 has an elongated length 94 that generally extends from the proximal end 92 of the chamber 80 to a distal end 96 of the chamber 80. An auger assembly 100 includes an auger 102 passing along at least a portion of the elongated length 94 of the chamber 80, and preferably is an auger 102 with a continuous length extending between the proximal end 92 of the chamber 80 and the distal end 96 of the chamber 80. The auger 102 preferably has a larger diameter than the type and construction of augers used in grain dryer assemblies, thus providing more auger space 104 (i.e., the volume within the helical blade structure) along the length of the auger 102 than the smaller diameter augers of traditional grain dryers. In a preferred form of the assembly, the auger 102 has a diameter in the range of 9 inches to 12 inches, which is significantly larger than a traditional grain dryer auger having a diameter in the range of 6 inches to 8 inches. Providing an auger 102 with a larger diameter, as described and shown herein, results in an auger assembly 100 with a relatively larger capacity for moving material along the helical length. Preferably, the pitch of the auger is in the range of approximately one revolution per diametral distance of length of the helical structure of the auger 102. Thus, a suitable auger 102 for use with the present dryer assembly 10 will have an overall diameter in the range of 9 inches to 12 inches, along at least a major extent of the auger length within the inner space 86 of the infeed chamber 80.

Rotation of the helical blade structure of the auger 102 is used to move the nuts 16 from the infeed supply 88 down the span of the infeed chamber 80, thus moving the nuts 16 from the proximal end 92 toward the distal end 96 of the infeed chamber 80. Rotation of the auger 102 is driven by a motor assembly 110 having a motor 112, a drive linkage 114 to transfer rotational torque to the rotor 102, and a gear mechanism 116 which is used to optimize the rotational torque of the motor 112 to achieve the appropriate speed of rotation and resulting torque or force exerted on the auger 102. In an example of a preferred embodiment, a 2-5 horsepower electric motor, which has a typical rotation speed in the range of 1750 revolutions per minute, is fitted with a ear mechanism 116 to reduce the revolution speed, such that the drive output of the motor assembly 110 is in the range of about 30 to 90 revolutions per minute, and preferably in the range of approximately 60 revolutions per minute. This arrangement, utilizing a gear mechanism 116 as part of the motor assembly 110, provides increased power relative the rotational movement of the auger, as compared to an auger directly driven by a motor such as was typical in the prior art use of grain dryers for nut drying applications, which typically have a drive output in the range of 300 to 400 revolutions per minute.

The auger 102 preferably resides in a middle region of the infeed chamber 80, such that the auger 102 is in contact with the nuts 16 entering the chamber 80 at the proximal end 92, and the auger 102 is then rotated to move the nuts 16 along the elongated length 94 of the chamber 80, toward the distal end 96 of the chamber 80. In a preferred embodiment, the assembly 10 includes a batch hopper tray 120 positioned below the auger 102, preferably in an arrangement whereby the hopper tray 120 is dimensioned to at least partially surround an area immediately adjacent a lower portion 106 of the auger 102. In a preferred form, the batch hopper tray 120 has a curved inner surface 124 configured to generally mate with the outer curvature of the helical auger 102 such that the auger 102 at least partially resides within the inner area of the hopper tray 120 that is defined by the side walls 122 of the hopper 120.

The batch hopper 120 is preferably an elongated tray that is mounted within the chamber 80 on a rotational axis 126 along the length of the hopper 120. The hopper tray 120 is thus preferably moveable between a first position 128 generally located below the auger 102, and a second position 130 located away from the first position, preferably located to a side of the auger 102. In other words, the hopper 120 is moveable between a first position 128 whereby the side walls receive and contain nuts 16 above the passageways 14 of the heater, to a second position 130 whereby the side walls 122 of the hopper are tilted to dispense or pour the nuts 16 into the passageways 14 of the dryer. This structure provides a batch hopper tray 10 that may be deployed to the first position 118 such that the nuts 16 are loaded into the chamber 80 and transferred down the auger 102 toward the distal end 96 of the chamber 80, and the hopper tray 120 subsequently may be rotated to the second position 130 to fill all of the vertical passageways 14 with nuts 16 generally at the same time and fill rate. This batch-fill operation of the assembly may be continuously repeated to fill the inner passageways 14 along the length of the dryer 10 to a substantially equal level, such as when it is desired to only fill the lower portion 70 of the passageways 14 and utilize the lower burner apparatus 68 to force heated dry air into the lower plenum chamber 58. Such use of the batch hopper tray 120 to fill just the lower portion 70 of the dryer 10 is very beneficial when processing nuts for drying. For example, during early or late parts of the growing/harvesting season, a limited supply of nuts may be processed for drying using the batch hopper 120 to generally evenly fill the dryer, and the optional mode of operation is used wherein only the lower portion 70 of the dryer is filled and subjected to heated dry air from the lower blower 68.

The dryer assembly 10 preferably has alternative modes of operation utilizing the construction of the infeed chamber 80 and the batch hopper 120. In a first mode of filling operation, shown in FIG. 4C, the inner passageways 14 are filled in sequence down the length of the dryer 10, similar to the filling operation of traditional assemblies. This filling mode is in effect by selectively positioning the hopper 120 to a non-use position, such as maintaining the hopper 120 in the second position 130 wherein the auger 102 is in contact with nuts 16 above a filled passageway 14. A fill indicator device 134 is located at or near the distal end 96 of the auger 102, positioned above the passageway 14 at the distal end 96 of the auger 102. The fill indicator device 134 may be a commercially available type of switch device, such as a "Bindicator" product of Food Machinery Corporation. For example, a suitable indicator switch may be Model Number SLC-3, offered for sale by Food Machinery Corporation. Utilizing this mode of filling the dryer 10 and the fill indicator device 134, the dryer is filled along the length of the dryer, linearly down the paired rows of passageways 14, until all of the inner passageways 14 are completely filled and the nuts 16 make contact with the fill indicator device 134. Once the fill indicator device 134 senses the dryer is full, then the intake of nuts into the infeed assembly 80 is slowed and regulated in substantial unison with the controlled flow through the dryer by the flow mechanism 28 and the removal of dried nuts 16 at the bottom of the dryer apparatus 10.

Figure 4A:
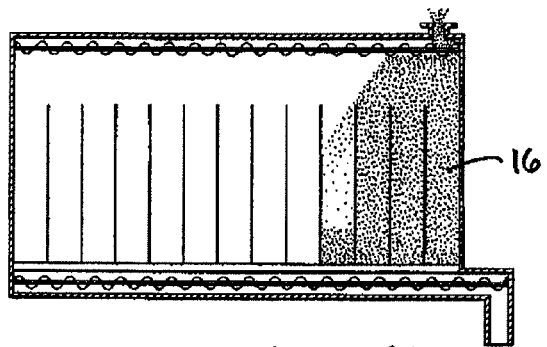
FIG. 4A labeled "PRIOR ART" is a representative cross-section view showing the process used for filling a typical prior art grain/nut dryer assembly.
Figure 4B:
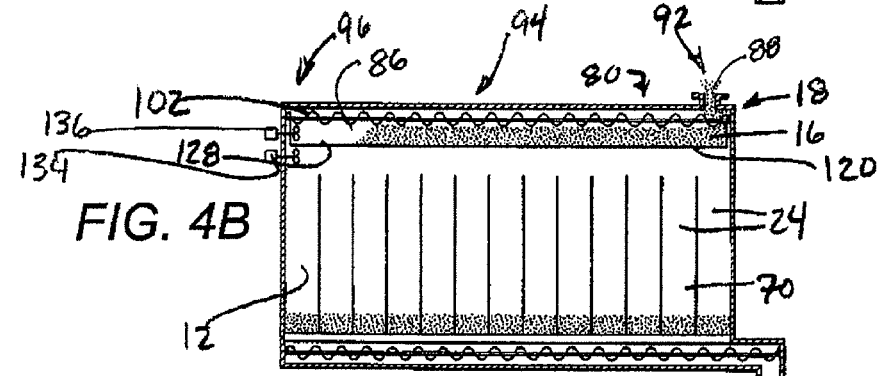
FIG. 4B is a representative cross-section view that depicts the structure for filling a the dryer apparatus of FIG. 2 in a "batch fill" configuration and mode of operation for evenly-filling the dryer with nuts.
Figure 4C:
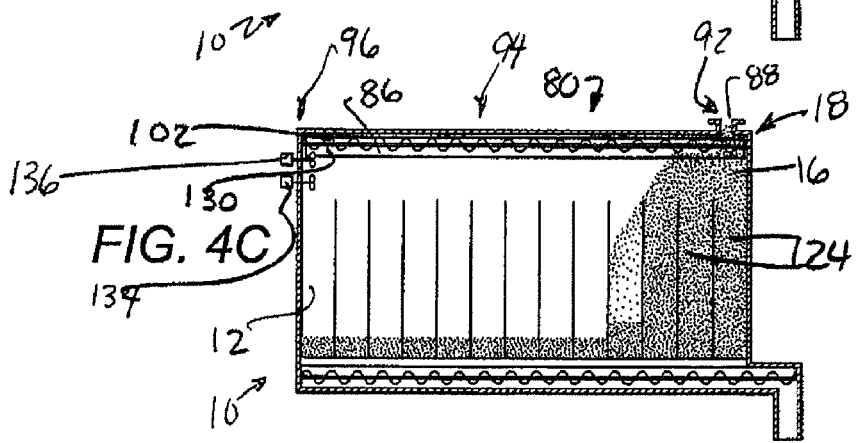
FIG. 4C is a representative cross-section view that depicts the structure for filling a the dryer apparatus of FIG. 2 in an alternative configuration and mode of operation linear progressive filling the dryer with nuts.

In an alternate mode of operation, as shown in FIG. 4B, the dryer is filled at a substantially equal rate along the length of the dryer, when using the batch feed hopper 120 of the infeed chamber 80. This mode of operation of batch filling the dryer preferably utilizes a batch hopper indicator device 138 located at the distal end of the auger 102 within the batch feed hopper 120, preferably within the confines of the hopper side walls 122. In this mode of fill operation, the nuts are introduced into the infeed chamber 80 at the proximal end 92 of the auger with the batch hopper 120 being positioned below the auger 102. As the auger 102 rotates, nuts 16 are moved toward the distal end 96 of the auger 102 within the hopper 120 toward the hopper indicator device 138. Preferably, the hopper indicator device 138 is configured to detect the fill of nuts within the hopper 120 at the distal end 96 and provide a signal to a control device 140 of the dryer 10, which then directs functions of the dryer to move the hopper 120 to the second position 130 to dispense the nuts into the passageways 14 along the length of the dryer 10. The hopper indicator device 138 may be constructed similar to the fill indicator device 134, although preferably located in a different position to provide the function of identifying a condition whereby the hopper tray 120 is substantially filled and the proper time for dumping the nuts into the passageways 14 by rotating the hopper 120 to the side of the auger. In an embodiment of this arrangement and operation of the hopper 120, alternating rotation of the hopper 120 may alternate between each side of the chamber 80 to generally evenly fill nuts into the respective sides of the paired passageways 14 at each side of the dryer.

The controller 140 of the dryer assembly includes the electrical connections to various parts of the dryer 10, such as burner igniters (not shown), burner sensors (not shown), the fill indicator 134, the hopper indicator 138, plenum thermometers (not shown), the infeed motor assembly 110, the outfeed motor assembly 144, and similar electrometrical devises and sensors. The controller 140 preferably includes a computer processing device and a controller interface that are housed within a controller cabinet 146, which has a readable display interface 148 providing information regarding the operation of the dryer 10. In a preferred embodiment, the controller cabinet 146 is in electrical connection with various parts of the dryer by a series of wires or electrical conduit 150 passing from the cabinet 146 to the dryer 10. In an embodiment, the controller cabinet 145 is positioned at a location adjacent, yet separate from, the dryer frame assembly 152. This arrangement of the controller being a distance away from the dryer frame may be preferable to keep the controller at a suitable distance to avoid damage or disruption to the drying operation resulting from vibration, debris or other potentially-adverse conditions at the location of the controller.

A fire suppression system 160 is preferably included at least partially within portions of the dryer 10. In an embodiment of this structure, the fire suppression system includes an upper supply pipe 162 passing along at least an extent of the length of the dryer, preferably two parallel upper pipes 162, located within the infeed chamber 80 and extending along the length of the chamber 80. In an embodiment shown in FIG. 3, the fire suppression system 160 also includes an upper plenum supply pipe 164 that extends along a substantial length of the dryer within the upper plenum chamber 56, and a lower plenum supply pipe 166 that extends along a substantial amount of the dryer length inside the lower plenum chamber 58. Each of these fire suppression pipes 162, 164, 166 are fitted with spray nozzles 168 for emitting fire suppression material, preferably water, in the event a fire is detected within the dryer, such as may be caused by some jamb or debris or the like within the inner passageway 14. In a preferred embodiment, the spray nozzles 168 are generally associated with the separate passageways 14 along the length of the dryer such that the nozzles 168 are directed to spray toward the nuts in each such passageway 14. Accordingly, as shown in FIG. 2, the number of nozzles 168 along the length of the dryer preferably is equal to, and associated directly with, the respective number of vertical passageways 14 of the dryer length.

In the preferred embodiment of this feature, the fire suppression pipe (with the nozzles 168) is located an upper region of the lower plenum chamber 58 and the upper plenum chamber 56. When activated, such as by detection of a fire and a signal at the computer control located at the control device 140 for the fire suppression feature to be activated, water sprays from the nozzles 168 and is directed toward the nuts 16 that are subject to the detected fire or overheated area.

Figure 3:
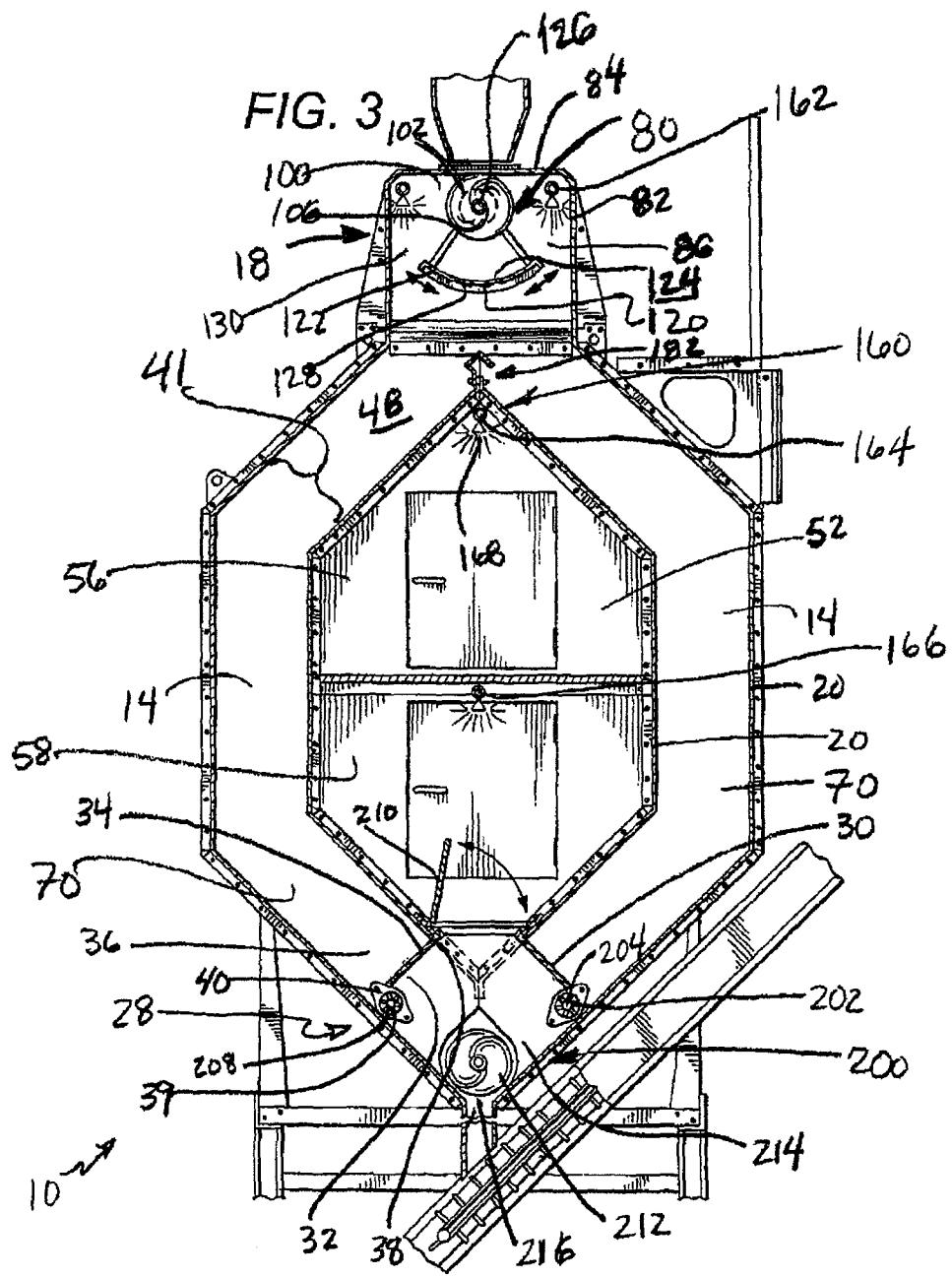
FIG. 3 is a cross-sectional view of the apparatus shown in FIG. 1, taken along the width of the apparatus shown in FIG. 1.

The bulkhead walls 42, 44, 46 and 48 which form the inner passageway 14 have a unique and beneficial construction of being substantially free of any seams that may potentially catch or snag debris or nuts passing through the passageway 14. This is a significant feature of the present dryer apparatus 10 that is superior over prior art devices which had been formed of segments of sheet stock, linked together and having the top edge of a lower segment exposed within the chamber to potentially catch debris, which leads to risk of fire and other damage to the operation, equipment and the nuts being processed. As is shown in FIGS. 3 and 5, the walls of each extending passageway 14 are formed from continuous lengths of sheet stock 170 into the desired passageway shape with a creased bend 172 of the material, preferably perforated metal stock with suitable sized perforation openings in the stock for air flow. Each of the elongated sheet-stock lengths 170 that form the passageway 14 are connected together by seams 172 that extend generally vertically, and the passageways therefore are void of transversely-extending seams—i.e., the passageways do not include generally horizontal seams that may result in product being trapped or damaged when passing along the inner passageway 14. This feature, elongated seamless sidewalls that are generally void of transverse seams, is a distinct aspect of the present invention, providing a continuous vertical extent of the passageway walls to form a generally smooth and obstruction-free passageway for nuts 16 passing through the dryer. In addition, the apparatus also preferably includes addition of ridge guards 180 that extend across horizontally-extending seams of walls or other components. For example, as is shown in FIG. 5, an upper elongated ridge guard 182 extends at least substantially down the entire length of the dryer, formed as a tent of sheet stock attached at the location of joining the top of the upper plenum 56. This upper ridge guard 182 is preferably formed by bending sheet stock to create a tent structure 184 with sloping walls 186, and a lower tail portion 188 that is configured to be joined with the plenum walls when secured together with bolts or the like. Another useful location for ridge guards in the embodiment shown in the Figures is a series of transversely-extending ridge guards 190 that extend generally transverse the upper ridge guard and are located in the positions at which the separate compartments of the inner passageway 14 are joined together to form the compartment assembly 12 of the apparatus 10. Similar to the upper elongated ridge guard 182, the transverse ridge guards 190 are preferably formed of sheet stock material that is formed into a tent structure 192, formed of sloping upper walls 194 and a lower tail 196. The lower tail 196 of the transverse ridge guards are used to join the guards 196 to the dividing walls 46 that join adjacent passageways 14. The ridge guards are configured in a way, and located in appropriate positions, to deflect nuts and debris from the seam of such parts and thereby prevent back-log or damming within the apparatus.

As shown in FIGS. 3 and 10-11, the outfeed roller 39 includes a roller assembly 200 that includes the roller 39 and an arrangement of split saddle bearings 40 that are mounted in fixed array at the lower portion of the inner compartment 12 of the dryer, adjacent the gate assemblies 38. Thus, the outfeed roller 39 is preferably an elongated roller with a general paddlewheel construction having a plurality of paddle surfaces 202 about a central axis 204. In the preferred form, the roller 39 is comprised of a series of roller length segments that are joined together along the length of the dryer at roller hubs 208, each roller length segment 206 is generally equal to the respective width of the inner passageway 14 in the specific region of the dryer 10, such that each such length segment 206 fits between two vertical walls that define the passageway 14. At least a portion of the length of the roller 39 includes a plurality of hubs 208 that are aligned with saddle bearings 40 to support the roller 39 in position, wherein each hub 208 is allowed to freely rotate to the side of an adjacent saddle bearing 40 such that the roller 39 is maintained in position yet free to rotate along its axis. A central linkage pin 207 is removably secured within an opening 209 along the central axis of the roller. Each central linkage pin 207 includes a roller hub connection 220 for securing the pin to a roller segment 206, and a bearing engagement region 222 configured to mate with a saddle bearing 40 as explained herein and shown in the exploded view of FIG. 11. In the preferred embodiment, the saddle bearings 40 are constructed of mating halves of a bearing body surrounding a respective hub 208. This construction allows for convenience when replacing or repairing the roller 39, by simply detaching each half of the saddle bearing 40 and thereby removing the saddle bearing 40 from around the mating surface 222 of the roller 39. Unlike typical prior art devices, wherein any repair of the roller required removal of the roller in a long process of gradually removing supporting bearing made of wood blocks, the present invention provides the benefit of rapid repair of a segment of a roller, such as welding a damage portion of the paddle.

Significantly, the structure of the present invention allows one to remove the entire roller 39 by simply removing the saddle bearings 40, then sliding the roller out of its position. Openings 224 in the walls of the dryer are dimensioned such that the roller 40 may be freely removed from the dryer 10, once the saddle bearings 40 are removed. Described another way, the present invention provides a dryer apparatus structure that includes openings 224 in the lower portion of the dryer that permits the diameter of the roller 40 (including the diameter of the hubs 208) to be freely inserted into the openings 224, and the saddle bearings 40 are then attached to the dryer to hold the roller 39 in position and allow rotational movement of the roller 39 by the bearing regions 222 rotating on an inner surface 226 of a respective saddle bearing 40

Also, in the preferred embodiment, an access panel 210 is provided in a lower portion of the lower plenum 58 at locations that allow for access to the saddle bearings 40 when the access panel 210 is moved, such as lifting an access panel 210 in FIG. 3. In yet another aspect of the preferred embodiment, a separate access panel 210 is located adjacent each separate passageway 14 along the dryer length. This arrangement of access panels 210 in such locations is useful to provide access to the outfeed rollers, the saddle bearings 40 and the outfeed auger 212, for repair or cleaning. The outfeed auger 212, therefore, is preferably positioned within a space that resides within an outfeed chamber 214 positioned below the outfeed rollers 39 and the adjustable gate openings 32. Rotation of the outfeed auger 212 moves the nuts down the length of the outfeed auger 212 toward an outfeed opening 216 of the dryer 10.

What is claimed is:

1. A dryer apparatus for drying pistachio nuts, comprising:
   a bulkhead assembly having an inner compartment defined by at least an outer wall and an inner wall, wherein at least a portion of the inner and outer walls are formed of perforated sheet material configured to allow forced air through the walls, wherein the inner compartment has at least one passageway between an upper infeed assembly and a lower outfeed assembly;

the infeed assembly having an infeed chamber with an elongated auger having an auger length and an elongated batch hopper positioned adjacent the auger along at least a portion of the auger length, said batch hopper being movable between a first position located generally below said auger and a second position located adjacent and to a side of the auger.

2. The dryer apparatus of claim 1 wherein the batch hopper has a curved inner surface configured to generally mate with an outer shape of the auger.

3. The dryer apparatus of claim 1 wherein the hopper is configured to rotate about an axis when moved between the first position and a second position.

4. The dryer apparatus of claim 3 wherein the hopper is configured to rotate about the axis to each of opposed sides of the auger.

5. The dryer apparatus of claim 1, wherein the infeed assembly is positioned above a row of separate passageways configured to receive nuts from the infeed assembly, said row of passageways including a proximal passageway at one end of the row and a distal passageway at the other end of the row; said batch hopper being in the first position during operation of the apparatus while the hopper is filled with nuts along the auger, and said hopper being in said second position while the nuts are received into the passageways from the infeed assembly.

6. The dryer apparatus of claim 5, wherein the infeed assembly has a proximal end with an opening configured to receive nuts into the infeed chamber and distal end at an opposite end of the auger, at least one fill indicator device is positioned at the distal end of the chamber to identify the presence of nuts.

7. The dryer of claim 6, wherein the infeed assembly has an upper fill indicator positioned above the batch hopper when in the batch hopper is in the first position, and a lower fill indicator positioned below the batch hopper when in said first position.

8. The dryer apparatus of claim 7, wherein the upper and lower fill indicators are configured to generate an electrical signal to identify the presence of nuts at the indicator, said upper fill indicator thereby generates an electrical signal to indicate the presence of nuts at the proximal end of the batch hopper, and said lower fill indicator generates and electrical signal to indicate the presence of nuts above a distal passageway of said row of passageways.

9. The dryer apparatus of claim 5, wherein the apparatus is configured to operate in a selectable mode of operation of the infeed assembly, including a batch fill mode wherein the batch hopper alternates between the first and second positions as the apparatus is filled with nuts such that each passageway of said row of passageways is generally filed with nuts to the same level as the remaining passageways, and a continuous fill mode wherein the batch hopper is positioned away from said first position as the apparatus is filled with nuts such that the row of passageways is generally filled with nuts in a sequential sequence beginning with said proximal passageway and ending with said distal passageway.

10. The dryer apparatus of claim 9, wherein a lower burner assembly is configured to force heated air toward a lower region of said row of passageways and an upper burner assembly is configured to force heated air toward an upper region of said row of passageways.

11. The apparatus of claim 10 wherein the apparatus is configured to dry a continuous feed of pistachio nuts in either the first mode wherein the passageways are generally evenly filled in a lower portion such that the lower burner assembly forces heated air into said lower portion, or in the second mode wherein the upper and lower portions of the passageways are filled such that the upper and lower burners are used to force heated air into the upper and lower portions of the passageways.

12. A dryer apparatus for drying harvested pistachio nuts, comprising:
a bulkhead assembly having an inner compartment region comprised of a plurality of chambers defined by chamber walls, wherein at least a portion of an outer wall and an inner wall are formed of perforated sheet stock material configured to allow passage of forced air through the sheet, and said chambers are positioned side by side along the length of the apparatus;
each said chamber having an inner passageway extending between an infeed assembly and an outfeed assembly, wherein the infeed assembly comprises a batch hopper with an elongated chamber and an auger, wherein rotation of the auger moves nuts along the length of the chamber, the infeed assembly also has a hopper tray apparatus residing in a first position below the auger and moveable to a second position located away from the first position to allow the nuts to pass from the chamber into all of the chambers generally at the same time and fill rate.

13. The dryer apparatus of claim 12 wherein sidewalls of the batch hopper receive and contain the nuts above said inner passageways when said batch hopper is in said first position, and when said hopper is in said second position the sidewalls are tilted to dispense the nuts into said inner passageways.

14. The dryer apparatus of claim 13, wherein at least an extent of the auger has a diameter in the range between nine inches to twelve inches.

15. The dryer apparatus of claim 13 wherein, wherein a lower burner assembly is configured to force heated air toward a lower region of said plurality of chambers and an upper burner assembly is configured to force heated air toward an upper region of said plurality of chambers.

16. The dryer apparatus of claim 15 wherein the apparatus is configured to dry a continuous feed of pistachio nuts in either a first operational mode wherein each chamber is generally evenly filled in a lower portion such that the lower burner assembly forces heated air into said lower portion, or in a second operational mode wherein the upper and lower portions of the chambers are filled and the upper and lower burners are used to force heated air into the upper and lower portions of the plurality of chambers.

17. The dryer apparatus of claim 16 wherein a batch hopper is positioned above the plurality of chambers and is movable between a use position and a non-use position; said batch feed hopper in the use position including an elongated inner chamber for generally equally distributing nuts to the chambers located along the length of the apparatus, and said hopper being moveable to the non-use position such that the plurality of chambers may be filled sequentially down the length of the apparatus.

18. A dryer apparatus for drying harvested pistachio nuts, comprising:
a bulkhead assembly having an inner compartment region comprised of a plurality of chambers defined by chamber walls, wherein at least a portion of an outer wall and an inner wall are formed of perforated sheet stock material configured to allow passage of forced air through the sheet, and said chambers are positioned side by side along the length of the apparatus;
each said chamber having an inner passageway extending between an infeed assembly and an outfeed assembly, wherein the infeed assembly comprises a batch hopper with an elongated chamber and an auger, wherein rotation of the auger moves nuts along the length of the chamber, the infeed assembly also has a hopper tray apparatus residing in a first position in which sidewalls of the hopper contain the nuts above the inner passageways, and said hopper tray having a second position in which said sidewalls are tilted to dispense the nuts into said inner passageways such that the nuts to pass from the chamber into all of the chambers generally at the same time and fill rate.

* * * * *